Patented Nov. 5, 1929

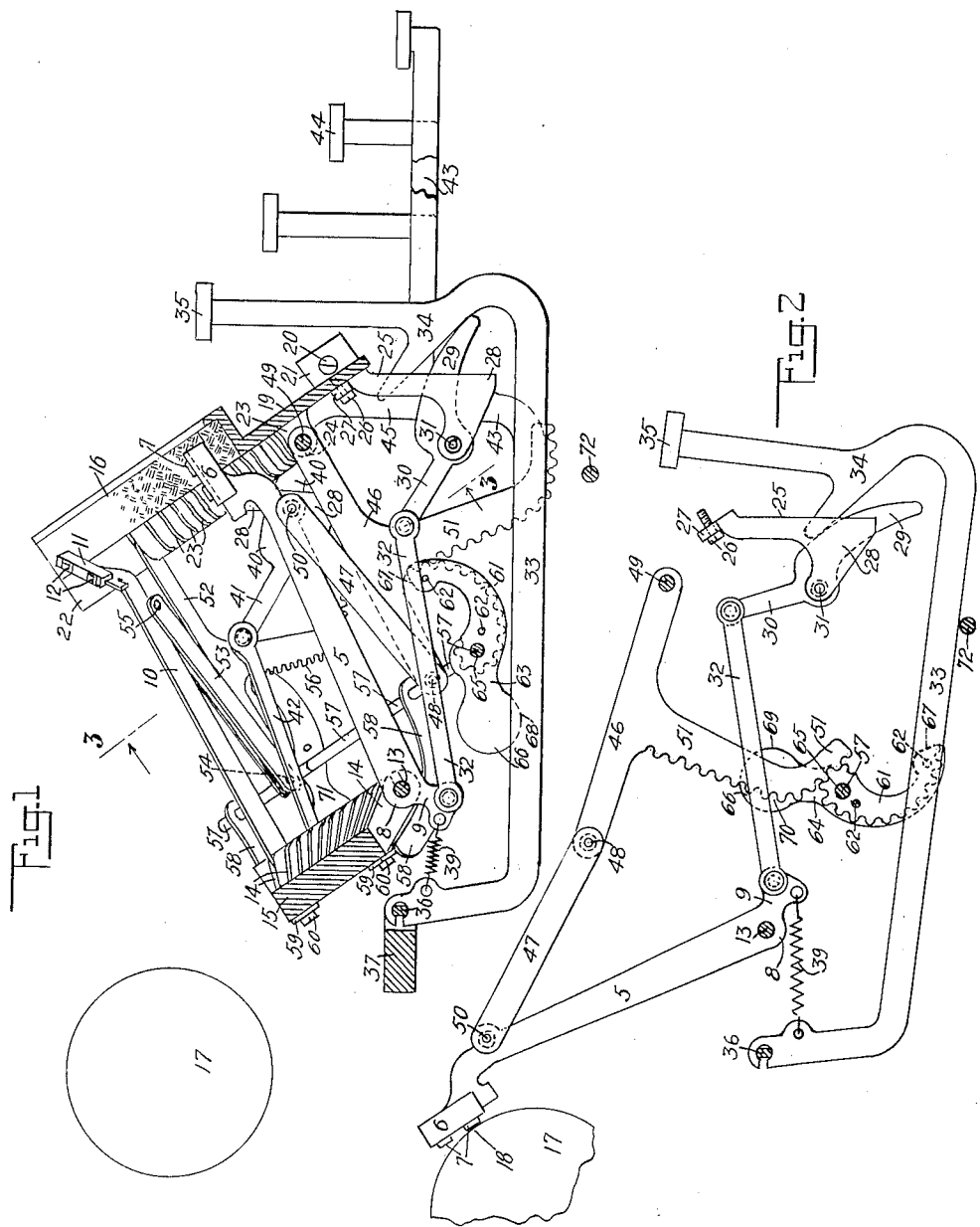

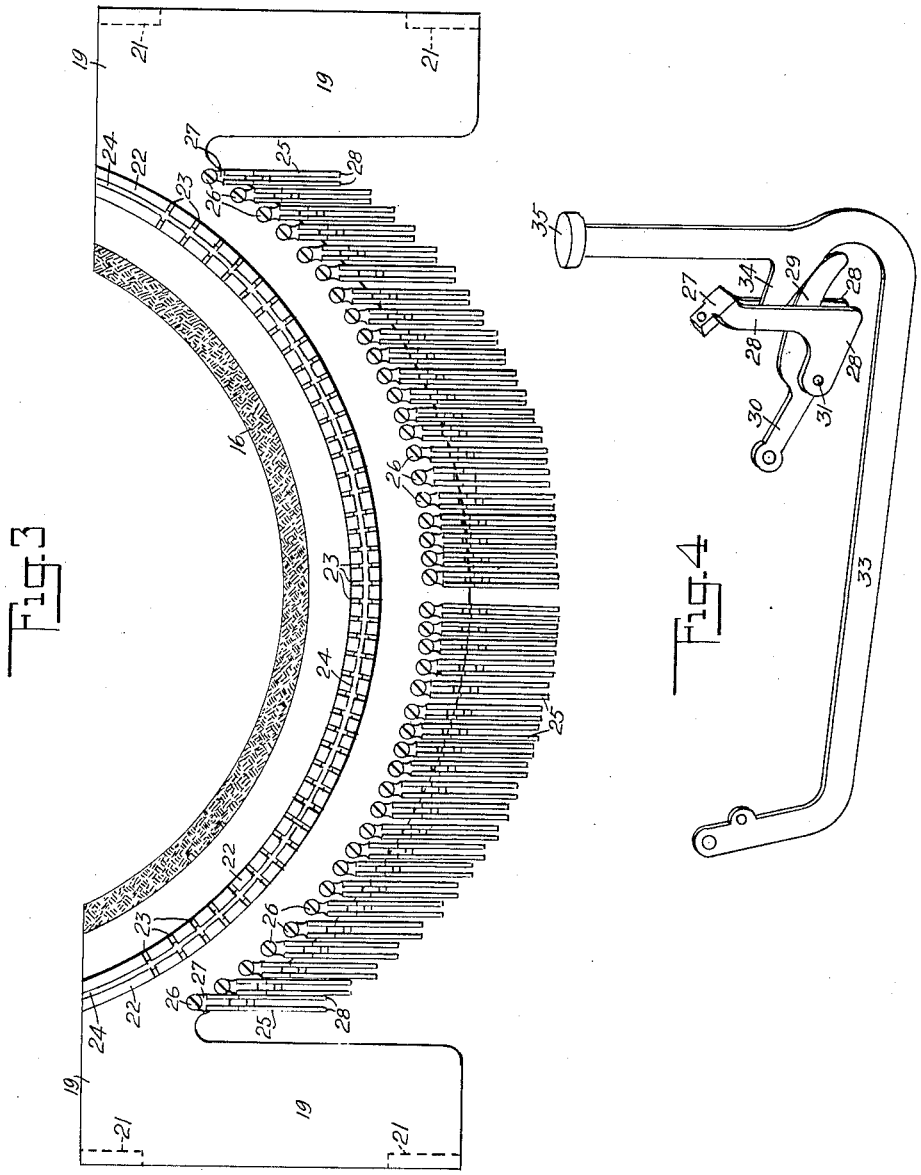

1,734,480

UNITED STATES PATENT OFFICE

GEORGE G. GOING, OF MIDDLETOWN, CONNECTICUT, ASSIGNOR TO REMINGTON TYPEWRITER COMPANY, OF ILION, NEW YORK, A CORPORATION OF NEW YORK

TYPEWRITING MACHINE

Application filed February 6, 1928. Serial No. 252,399.

This invention relates to typewriting machines which have pivoted typebars and to improvements in the mechanism by which the typebars are operated. The main object of the invention is to render the typebars of either a large or a small machine noiseless, or much less noisy than pivoted typebars commonly are, but an additional object is the production of a noiseless or approximately noiseless system of typebars suitable for use in such small machines as those which are called portable typewriting machines.

Several inventions more or less closely resembling this have been made by me, and two of them are described and claimed in applications for patents, which were filed December 27, 1927 and bear the Serial Numbers 242,799 and 242,800. As application 242,799 contains a claim for a typebar-silencer having essentially the construction of the device which is shown herein and called a typebar-silencer and which is a typebar-retarding and typebar-driving device somewhat similar to a governor, that device is not separately claimed in this application, the claims of which are so limited as to make them distinguish the invention which they define from that claimed in either of the above mentioned prior applications or any other application heretofore made by me. The present invention consists of combinations in which a typebar and actuating mechanism including a typebar-silencer or driving device or controlling device are elements, and which are particularly described herein and defined in the appended claims.

On the accompanying two sheets of drawings on which like reference numerals designate like portions of different views:

Fig. 1 is a sectional and side elevation of mechanism which embodies the invention and which includes two typebars and typebar-actuating means, one of the typebars being at the middle and the other at the right side of the system of typebars of a typewriting machine;

Fig. 2 a side elevation of a portion of the said mechanism as it appears at a particular stage of the operation;

Fig. 3 a rear view of the front plate which is shown in section in Fig. 1, and of the supports formed on and attached to it and of the typebar-rest, the plane and direction of the view being indicated in Fig. 1 by the broken line 3—3 and the arrow; and Fig. 4 a perspective of a keylever, sub-lever and hanger shown in Fig. 1, the sub-lever being mounted in the hanger.

The drawings are full sized views of the mechanism which they represent and which is a portion of a small or "portable" machine. The two typebars 5 and 10 are mounted on the arcuate pivot wire 13, the former being about midway between the ends and the latter near the right end of the wire and they fit loosely in kerfs 14 cut in the wire-supporting segment 15. The typebars 5 and 10 include the typeblocks 6 and 11 and the type 7 and 12, respectively, and the typeblocks lie on the typebar-rest 16 when the bars are in their normal positions. The printing position of a bar is that which it takes when one of its type makes contact with the platen 17 at the printing point 18 (Fig. 2). The angular movement of each typebar is ninety degrees or thereabouts, but might be more, and the relation of the segment to the platen might be such as to make the printing point higher or lower on the platen than where it is represented in Fig. 2 of the drawings. Of course the machine includes means for enabling the platen and segment to be relatively shifted so that either type of each typebar may be swung to the platen at the printing point. The pivot-wire 13 passes through the base 8 of typebar 5 and base of typebar 10 and the base of every other typebar of the system. On the base of typebar 5 is the short arm 9 and on the base of typebar 10 is a short arm like arm 9. Of course typebar 10 is bent near the typeblock 11 more than bar 5 is near the typeblock 6, and the type on block 11 differ from the type on block 6 in respect of the characters formed by them, but in all other respects these typebars are exactly alike. Every other typebar of the system is exactly like each of the above described typebars except in respect of the bend near the typeblock and the characters formed on it.

The inclined front plate 19 (Figs. 1 and 3)

supports the typebar-rest and is a portion of the framework of the machine. It may be fastened to the sides of the main frame, or to posts, by the screw 20 and others passing through the lugs 21 projecting from the plate (Figs. 1 and 3). The arcuate rib 22 near the typebar rest is formed on the back of plate 19 and this rib is cut transversely and from end to end so that it contains the radial kerfs 23 and the groove 24 (Fig. 3). The series of hangers 25 is attached to this plate 19 by the screws 26 (Fig. 3), these hangers being all alike and each having the inclined and perforated end or head 27 through which passes a screw 26, and the two parallel flat sides 28 (Figs. 3 and 4). This series of hangers supports a series of sub-levers which are all alike and each of which is connected to a typebar by a link. The sublever which is connected to typebar 5 has the front rocker-arm 29 and rear arm 30, and is pivoted on and between the sides of its supporting hanger by a pin 31. The link 32 is pivoted at its front end to arm 30 of the sublever and at its rear end to arm 9 of the typebar.

The keylever 33 which includes the portion 34 and the head or cap 35 is pivotally mounted at its rear end on the cross rod 36 attached to the fixed cross bar 37, and the portion 34 of this keylever extends over rocker-arm 29 of the described sublever and between the sides of its hanger. When the keylever and typebar 5 are in their normal positions the portion 34 of the keylever makes contact with arm 29 of the sublever close to the front end of the arm and diverges from the sublever behind that contact. If the keyhead 35 is then depressed to the position indicated in Fig. 2 the sublever is rocked, and typebar 5 is swung, to the positions shown in that figure, by the action of the keylever on the rocker-arm 29 which rocks or rolls on portion 34 of the keylever until the rear end of that portion reaches the arm. Of course the effective length of the arm diminishes from the beginning to the end of the action, and only a light touch on the keylever is required to actuate the typebar. The keylever and typebar, together with the sublever and link 32, are restored to their normal positions by the spring 39 attached to the keylever near cross rod 36 and to arm 9 of the typebar.

The sublever which has the front rocker-arm 40 and rear arm 41 (Fig. 1) and which is exactly like the above described sublever, is pivoted on the hanger which is at the right end or side of the series by a pin like the pin 31, and the link 42 is pivoted at its front end to the arm 41 of the sublever and at its rear end to the short arm on the base of typebar 10. The keylever 43, pivoted at its rear end on cross rod 36 and having the keyhead 44, includes the upwardly and backwardly extending arm 45 which next to its upper end is like portion 34 of lever 33 in shape and passes between the sides of the hanger and over the arm 40 of the sublever, making contact with the arm 40 at its front end and diverging from the latter arm behind that contact when the keylever and sublever are in their normal positions. When the keyhead 44 is depressed arm 45 of keylever 43 acts on arm 40 of the sublever as portion 34 of keylever 33 acts on arm 29 of the previously described sublever, and the typebar 10 is swung upward and backward as typebar 5 is so swung when keyhead 35 is depressed.

Each of the other keylevers of the machine is pivotally mounted at its rear end on the cross rod 36 and includes a portion which is related to and acts on a sublever as described and which like portion 34 of keylever 33 is formed on the stem of a keylever or else like the corresponding portion of keylever 43 is formed on an arm similar to arm 45 of the latter keylever.

The links 46 and 47 are joined together by the pivotal joint 48 and form a toggle which is pivoted at its front end on the wire 49 and at its other end to typebar 5 by the pin 50 passing through an ear on the back of the typebar near the typeblock. Pivot wire 49 fits in groove 24 in rib 22 and is supported by that rib, and the front end of link 46 is in the radial kerf 23 the faces of which are in the planes that contain the faces of the kerf 14 in which typebar 5 is mounted on pivot wire 13. The rack 51 is a downwardly extending arm of the link 46 and it passes below and on one side of link 32, the pitch-line of the rack-teeth at the lower end of the arm being or approximating an arc the radius of which is that of a circle having its center on the axis of the link 46.

The links 52 and 53, which form a toggle like that described, are joined together by the pivotal joint 54 and are pivoted respectively on wire 49 in the kerf 23 which is at the right end of the series, and to the typebar 10 by the pin 55 (Fig. 1). The rack 56 is an arm of the link 52, which link and rack are exactly like link 46 and rack 51, and link 53 is exactly like link 47.

To every other typebar of the machine is connected a toggle which is like one of those described including the rack and is pivoted at its front end on the wire 49 in its appropriate kerf 23 of rib 22.

A typebar-silencer, or governor, or controlling device, closely resembling if not the same as that shown and described in the aforesaid application No. 242,800, is connected to each of the toggles, and these silencers are included in the means by which the typebars are operated. The silencers or controlling devices are mounted on the arcuate pivot rod 57 which is supported by the arms 58 and others like them, and passes behind and below the typebars, these arms having perforated ears 59 and being fastened to the segment 15 by screws 60 as shown (Fig. 1), although they might be fastened to some other portion of the framework. The form and construction of the silencers may be varied but preferably are those shown and described. Each silencer is composed of the rack 61 and a pair of side plates permanently fastened together by rivets 62, or otherwise, the rack being between the side plates. The plate 63 (Fig. 1) is one of the plates of this pair and the other, which is a duplicate of it, is the plate 64 (Fig. 2). Plate 63 is not shown in Fig. 2, the plane of the section being between that plate and the rack 61. The pitch-line of this rack is equal in length to that of rack 51. The rod 57 passes through the pivot hole 65 of each silencer. This hole is near the middle of the device and near the inner end of rack 61 and passes through the rack and both side plates. The side plates extend beyond the inner end of the rack and form the end or edge 66 of the device, which end or edge is on the opposite side of the hole 65 from the end or edge 69 that is formed by the side plates and outer end of the rack. The portions 68 and 69 of the side plates form side walls of the space 70 that extends from end or edge 66 of the device to the inner end of the rack, these portions being wider near their outer ends than they are near the rack. The rack-teeth of racks 51 and 61 intermesh, so that these racks are permanently geared together.

The silencer or governor or controlling device 71 (Fig. 1) is a duplicate of the silencer which has been described and is geared to rack 56. A silencer like this is geared to the rack of each toggle, all of the silencers being mounted on the pivot wire 57 which passes through holes in them like hole 65 (Figs. 1 and 3) and on which they turn when the typebars are actuated.

The keys may be depressed until the keylevers reach the stop 72, which is a fixed bar that extends from side to side of the machine under the keylevers.

The keyhead or keycap of a keylever properly operated is depressed quickly and far enough to force the lever to touch the stop bar 72. As the keyhead 35 of keylever 33 for example descends and typebar 5 is pulled by link 32 from its normal position and swung backward as described, the typebar draws backward the upper end of toggle-link 47 and toggle-link 46 is turned with an accelerated motion on the wire 49. Thus, motion is imparted to the typebar-silencer which is forced to turn on wire 57 by the action of rack 51 on rack 61. Of course the resistance of the silencer increases rapidly as the meeting point of the pitch-lines of racks 51 and 61 moves farther from rod 49 and nearer to rod 57, and that resistance tends to retard the typebar, and continues to act until the keylever has been arrested by the stop 72 or force is no longer exerted on the key. The motion of the typebar is slower when it has reached the position where it is shown in Fig. 2, the type almost but not quite touching the platen, than it then would be if the actuating mechanism of the typebar included only the keylever 33, the sublever and the link 32. From that position the typebar is driven slowly to the platen and then is subjected to presssure while the type is in contact therewith, by the action of the silencer continuing to turn by virtue of its own momentum and acting on the toggle through the rack 51, which extends into space 70, and being suddenly stopped by the unyielding resistance of the platen.

The actuation of typebar 10, or that of any of the other typebars of the system, by means of its keylever and the other actuating devices including the toggle and silencer, is like that of typebar 5 and will be fully understood it is believed from the foregoing description.

Various changes may be made without departing from the essence and scope of my invention.

What I claim as new and desire to secure by Letters Patent, is:—

1. The combination of a pivoted typebar, and actuating mechanism comprising a toggle and a pivotally mounted typebar-controlling device geared together, one link of the toggle being pivoted to the typebar and the other to the framework.

2. The combination of a pivoted typebar, and actuating mechanism comprising a toggle and a pivotally mounted typebar-silencer geared together, one link of the toggle being pivoted to the typebar near the typeblock and the other to the framework near the typebar-rest.

3. The combination of a pivoted typebar, and actuating mechanism comprising key-operated means connected to the typebar, a toggle having a rack on one of the toggle-links, and a pivotally-mounted typebar-controlling device having a rack that meshes with the aforesaid rack, that toggle-link which includes the rack being pivoted to the framework and the other toggle-link being pivoted to the typebar.

4. The combination of a pivoted typebar, and actuating mechanism comprising key-operated means connected to the typebar near its pivotal axis, a toggle having a rack on one of the toggle-links, and a pivotally mounted typebar-silencer having a rack that meshes with the aforesaid rack, that toggle-link which includes the rack being pivoted to the framework near the typebar-rest, and the other toggle-link being pivoted to the typebar near the typeblock.

5. The combination of a pivoted typebar, and actuating mechanism comprising key-operated means connected to the typebar, a toggle having a rack on one of the toggle-links, and a pivotally-mounted typebar-silencer having a rack that meshes with the aforesaid rack, that toggle-link which includes the rack being pivoted to the framework and the other toggle-link being pivoted to the typebar, and the key-operated means being a keylever, a sublever having an arm with which the keylever makes a rolling contact, and a link connected to the sublever and to the typebar.

6. The combination of a pivoted typebar, and actuating mechanism comprising key-operated means connected to the typebar near its pivotal axis, a toggle having a rack on one of the toggle-links, and a pivotally-mounted typebar-silencer having a rack that meshes with the aforesaid rack, that toggle-link which includes the rack being pivoted to the framework near the typebar-rest, and the other toggle-link being pivoted to the typebar near the typeblock, and the key-operated means being a keylever, a sublever having an arm with which the keylever makes a rolling contact, and a link connected to the sublever and to the typebar.

7. The combination of a pivotal typebar, and actuating mechanism comprising a toggle and a pivotally-mounted typebar-controlling device, one link of the toggle being pivoted to the framework and having on it a toothed arm forming a rack and the other link being pivoted to the typebar, and the typebar-controlling device being mounted on a stationary support and having a rack that meshes with the aforesaid rack.

8. The combination of a pivoted typebar, and actuating mechanism comprising a toggle and a pivotally-mounted typebar-silencer, one link of the toggle being pivoted to the framework near the typebar-rest and extending backward therefrom and having on it a downwardly extending toothed arm forming a rack and the other toggle-link being pivoted to the typebar near the typeblock, and the typebar-silencer being mounted on a stationary support below the toggle and having a rack that meshes with the aforesaid rack.

9. The combination of a pivoted typebar, and actuating mechanism comprising key-operated means connected to the typebar, a toggle and a pivotally mounted typebar-silencer, one link of the toggle being pivoted to the framework near the typebar-rest and extending backward therefrom and having on it a downwardly extending toothed arm forming a rack and the other toggle-link being pivoted to the typebar near the typeblock, and the typebar-silencer being mounted on a stationary support below the toggle and having a rack that meshes with the aforesaid rack, and the key-operated means being a keylever, a sublever having an arm with which the keylever makes a rolling contact, and a link connected to the sublever and to the typebar near its pivotal axis.

10. The combination of a pivoted typebar, actuating mechanism comprising a keylever and means which it actuates and which is connected to the typebar, a stop limiting the movement of the keylever when it actuates said means, a toggle having a rack on one of the toggle-links, and a pivotally mounted typebar-silencer having a rack that meshes with the aforesaid rack, that toggle-link which includes the rack being pivoted to the framework and the other toggle-link being pivoted to the typebar.

11. The combination of a pivoted typebar, actuating means which is connected to the typebar and in which a keylever is included, a pair of jointed links that form a toggle pivoted at one end to the framework and at the other to the typebar, and a driving device that has a toothed gear connection with and acts on the toggle when the typebar reaches its printing position.

12. The combination of a pivoted typebar having a short arm near its pivotal axis, actuating mechanism which is connected to said arm and in which a keylever is included, a pair of jointed links that form a toggle pivoted at one end to the framework near the typebar-rest and at the other end to the typebar near the typeblock, and a driving device that has a toothed gear connection with and acts on the toggle when the typebar reaches its printing position.

Signed at Middletown, in the county of Middlesex and State of Connecticut, this 1st day of February A. D. 1928.

GEORGE G. GOING.